United States Patent
Yu et al.

(10) Patent No.: US 11,984,797 B2
(45) Date of Patent: May 14, 2024

(54) ADAPTER CIRCUIT, FILTER SYSTEM, AC-DC POWER SOURCE AND METHOD

(71) Applicant: ZHEJIANG UNIVERSITY, Hangzhou (CN)

(72) Inventors: Faxin Yu, Hangzhou (CN); Yihe Wang, Hangzhou (CN); Xiaofeng Lv, Hangzhou (CN); Hua Chen, Hangzhou (CN); Jiongjiong Mo, Hangzhou (CN); Zhiyu Wang, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/218,114

(22) Filed: Jul. 5, 2023

(65) Prior Publication Data

US 2024/0048044 A1 Feb. 8, 2024

(30) Foreign Application Priority Data

Aug. 5, 2022 (CN) .......................... 202210935551.1

(51) Int. Cl.
*H02M 1/12* (2006.01)
*H02M 1/00* (2006.01)
(Continued)

(52) U.S. Cl.
CPC ........... *H02M 1/12* (2013.01); *H02M 1/0022* (2021.05); *H02M 1/15* (2013.01); *H02M 3/158* (2013.01)

(58) Field of Classification Search
CPC ........ H02M 1/12; H02M 1/0022; H02M 1/15; H02M 3/158
See application file for complete search history.

(56) References Cited

U.S. PATENT DOCUMENTS 7,760,524 B2 * 7/2010 Matthews ............... H02M 1/10
363/45
9,787,193 B2 * 10/2017 Song ....................... H02M 7/06
(Continued)

FOREIGN PATENT DOCUMENTS

CN 104578729 A 4/2015
CN 104578843 X 4/2015
(Continued)

OTHER PUBLICATIONS

Zhang, Hongliang, et.al, The method to reduce DC Bus Voltage Ripple for Novel Four-Quadrant Cascade Multi-Level Inverter, «Electrical Technology», Jul. 31, 2016, p. 68-74, Issue 7, China Electrotechnical Society, Beijing, CN.

*Primary Examiner* — Rafael O De Leon Domenech
(74) *Attorney, Agent, or Firm* — IPRTOP LLC

(57) ABSTRACT

The present disclosure provides an adapter circuit including a bus capacitor, a PMOS power transistor, and a sampling control module; a positive terminal of the bus capacitor is connected to a DC bus voltage, and a negative terminal of the bus capacitor is connected to a drain of the PMOS power transistor; a gate of the PMOS power transistor is connected to a drive signal, and a source of the PMOS power transistor is grounded; the sampling control module is used to obtain the drive signal by detecting an AC mains input voltage and a power-down voltage when the bus discharges, so as to turn off the PMOS power transistor after the AC mains input voltage reaches a peak value, and turn on the PMOS power transistor after the power-down voltage reaches a set voltage; the drive signal includes a PMOS Turn-on signal and a PMOS Turn-off signal.

17 Claims, 5 Drawing Sheets

(51) Int. Cl.
*H02M 1/15* (2006.01)
*H02M 3/158* (2006.01)

(56) References Cited

U.S. PATENT DOCUMENTS

| | | |
|---|---|---|
| 2010/0027304 A1 | 2/2010 | Wang et al. |
| 2016/0036318 A1 | 2/2016 | Young et al. |
| 2016/0181931 A1 | 6/2016 | Song et al. |

FOREIGN PATENT DOCUMENTS

| | | |
|---|---|---|
| CN | 105958836 A | 9/2016 |
| CN | 109194166 A | 1/2019 |
| CN | 110138231 A | 8/2019 |
| EP | 4033863 A | 7/2022 |

* cited by examiner

| Bus Capacitance | 4*27uF/400V | 3*27uF/400V |
|---|---|---|
| Traditional Scheme | 92.77% | 92.40% |
| Present Scheme | 93.40% | 92.92% |

ADAPTER CIRCUIT, FILTER SYSTEM, AC-DC POWER SOURCE AND METHOD

CROSS REFERENCE TO RELATED APPLICATION

The present application claims the benefit of priority to Chinese Patent Application No. CN 2022109355511, entitled ADAPTER CIRCUIT, FILTER SYSTEM, AC-DC POWER SOURCE AND METHOD", filed with CNIPA on Aug. 5, 2022, the disclosure of which is incorporated herein by reference in its entirety for all purposes.

FIELD OF TECHNOLOGY

The present disclosure relates to integrated circuit design, and in particular, to an adapter circuit, a filter system, an AC-DC power source, and a method.

BACKGROUND

As Type-C mobile phone adapter technology gets increasingly popular and mature, the demand for compact and highly efficient universal mobile phone chargers is also on the rise. Compact chargers take up less space and are easier to carry, which makes the miniaturization of universal mobile phone chargers an important research topic.

An adapter converts municipal AC voltage into DC voltage, so it is often necessary to install several large electrolytic capacitors in the adapter to smooth out the transient power difference during the conversion of AC to DC. This can ensure the stability and efficiency of charging electronic devices such as mobile phones, but leads to another problem: those electrolytic capacitors usually have high breakdown voltage and large capacitance, so they are larger in volume, taking too much space in the adapter, thus hindering further miniaturization of the charger.

FIG. 1 shows large electrolytic capacitors of traditional adapters, where four diodes D01-D04 form a bridge rectifier circuit to rectify AC voltage into DC voltage, and C0 is a large electrolytic capacitor whose value is given by:

$$C0 = \frac{P_O(\pi - \cos^{-1}(V_{min}/\sqrt{2}\,V_{rms}))}{\pi f(2V_{rms}^2 - V_{min}^2)},$$

where $P_o$ is the output power, f is the mains frequency (such as 50 Hz), $V_{rms}$ is the effective value of the mains voltage (such as 220V), and $V_{min}$ is the lowest point of the mains transient voltage. FIG. 2 shows waveforms of relevant signals in FIG. 1. It can be seen from FIG. 2 that the large electrolytic capacitor C0 stays in a discharging state from t1 to t2 in the traditional scheme.

To solve the above problem, the solution of directly removing the large electrolytic capacitors is adopted by some products on the current market. This scheme ignores secondary pulsating power harmonics generated by the DC voltage and directly transmits the harmonic energy to the battery to be charged, which imposes strict requirements on the battery's materials and therefore is not universally applicable. In addition, this scheme only works well with mobile phones of certain types, and will have a reduced efficiency and charging speed when used for mobile phones of other types.

SUMMARY

The present disclosure provides an adapter circuit including a bus capacitor, a PMOS power transistor, and a sampling control module; wherein a positive terminal of the bus capacitor is connected to a DC bus voltage, and a negative terminal of the bus capacitor is connected to a drain of the PMOS power transistor; a gate of the PMOS power transistor is connected to a drive signal, and a source of the PMOS power transistor is grounded; wherein the sampling control module is used to obtain the drive signal by detecting an AC mains input voltage and a power-down voltage in case of bus discharge, to turn off the PMOS power transistor after the AC mains input voltage reaches a first peak value, and to turn on the PMOS power transistor after the power-down voltage reaches a set voltage; the drive signal comprises a PMOS Turn-on signal and a PMOS Turn-off signal.

The present disclosure further provides a filter system including an adapter circuit as described above.

The present disclosure further provides an AC-DC power source including a filter system described above.

The present disclosure further provides a method to reduce bus capacitance based on an adapter circuit described above, and the method includes:

simultaneously supplying power to a bus capacitor and a subsequent load by AC mains in an initial state, where the bus capacitor stays in a charging state in the initial state;

detecting an AC mains input voltage and turning off a PMOS power transistor after a detected value of the AC mains input voltage peaks, where a discharge path of the bus capacitor is disconnected and a voltage across the bus capacitor peaks, and the subsequent load is powered by AC mains; and detecting a voltage at a drain of a PMOS power transistor, and turning on the PMOS power transistor after a power-down voltage reaches a set voltage, where the discharge path of the bus capacitor is established to supply power to the subsequent load based on the voltage across the bus capacitor.

In summary, the present disclosure provides an adapter circuit, a filter system, an AC-DC power source, and a method thereof, wherein through connecting a PMOS power transistor with a negative terminal of a bus capacitor in series and controlling the on-off of the PMOS power transistor by a sampling control module, the power supply duration of AC mains is prolonged, and energy stored in the bus capacitor is reduced, thus reducing the volume of the bus capacitor while retaining the same output power; a PMOS power transistor is used as the re device and connected in series with a bus capacitor and a source of the PMOS power transistor is grounded, so that the gate drive does not need to be floating grounded and the control thereof is relatively simple. For the power section of the circuit, only one PMOS transistor is needed and it is connected in series with a bus capacitor, making it easier to connect, control, and design a corresponding drive circuit.

REFERENCE NUMERALS

Figure 1:
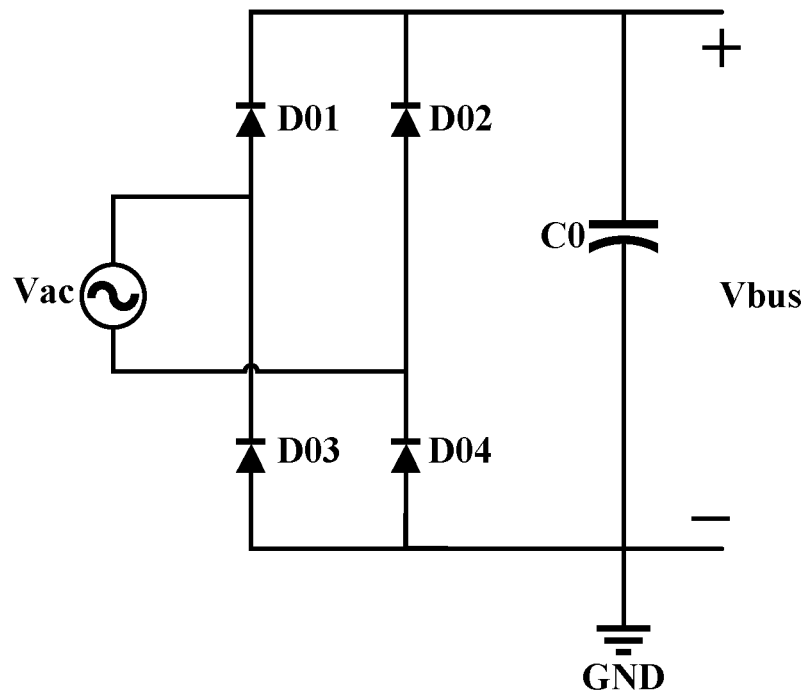
FIG. 1 shows a schematic diagram of a traditional adapter circuit.

10 Rectifier module
20 Sampling control module
21 Differential sampling unit
211 Input unit
212 Positive half-wave sampling unit
213 Negative half-wave sampling unit
22 Discharge voltage detection unit
221 Detection and conversion unit
222 Comparison and output unit
23 Peak voltage detection unit
231 Differential amplification unit
232 Drive generation unit

DETAILED DESCRIPTION

The implementations of the present disclosure are described below through specific embodiments. Other advantages and effects of the present disclosure will be readily apparent to those skilled in the art from the content disclosed in the description. The present disclosure can also be implemented or applied through other different specific embodiments, and various details in the description can also be modified or changed without departing from the spirit of the present disclosure based on different viewpoints and applications.

Please refer to FIG. 3 to FIG. 10. It should be noted that the illustrations provided herein only illustrate the basic concept of the present disclosure schematically, and therefore the illustrations only show the components closely related to the present disclosure and are not necessarily drawn according to the number, shape, and size of the components in the actual implementation. The shape, quantity, and proportion of each component in the actual implementation may be changed according to the actual situation, and the layout of the components may also be more complex.

Figure 3:
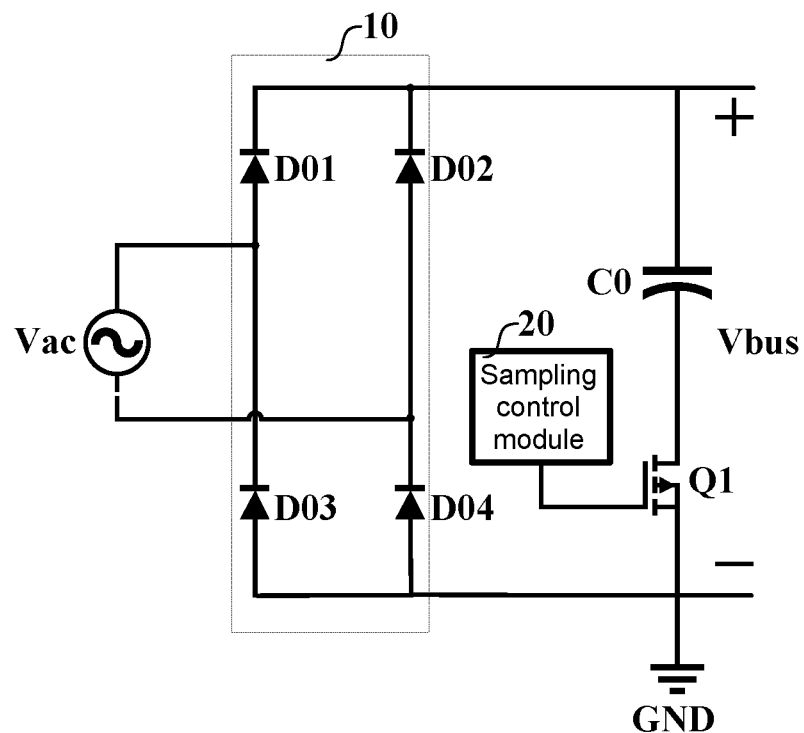
FIG. 3 shows a schematic diagram of an adapter circuit of the present disclosure.

As shown in FIG. 3, the present disclosure provides an adapter circuit including a bus capacitor C0, a PMOS power transistor Q1 and a sampling control module 20. Further, the adapter circuit also includes a rectifier module 10.

The rectifier module 10 is used to output a DC bus voltage after rectifying a voltage input by the municipal AC power supply (hereinafter, AC mains).

Specifically, in one example, the rectifier module 10 is formed by a bridge rectifier circuit comprising four diodes D01-D04.

A positive terminal of the bus capacitor C0 is connected to the DC bus voltage, and a negative terminal of the bus capacitor C0 is connected a drain of the PMOS power transistor Q1; the bus capacitor C0 is an electrolytic capacitor. In practical applications, the bus capacitor C0 may include one electrolytic capacitor, or two or more electrolytic capacitors connected in parallel.

A gate of the PMOS power transistor Q1 is connected to a drive signal, a drain of the PMOS power transistor Q1 is connected to a negative terminal of the bus capacitor C0, and a source of the PMOS power transistor Q1 is grounded; the drive signal controls the on-off of the PMOS power transistor Q1 to control the on-off of a path connecting the bus capacitor C0 to ground, thus shortening a discharge time of the bus capacitor C0, prolonging a power supply duration of the AC mains, and reducing the energy stored in the bus capacitor C0. The PMOS power transistor Q1 can be a low-voltage power transistor, which reduces cost and improves reliability.

The sampling control module 20 is used to obtain the drive signal by detecting an AC mains input voltage and a power-down voltage when the bus capacitor is discharged, so as to turn off the PMOS power transistor Q1 after the AC mains input voltage reaches a peak value, and turn on the PMOS power transistor Q1 after the power-down voltage reaches a set voltage; the drive signal includes a PMOS Turn-on signal and a PMOS Turn-off signal.

Figure 4:
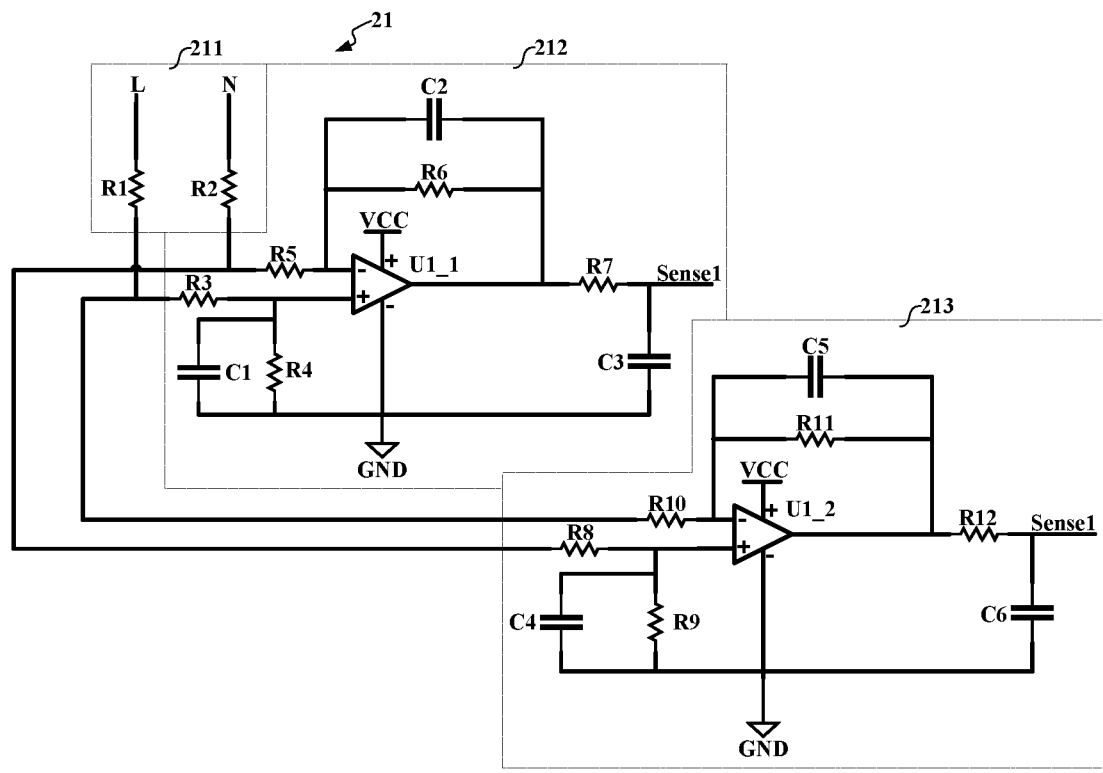
FIG. 4 shows a schematic diagram of a differential sampling unit of the present disclosure.
Figure 5:
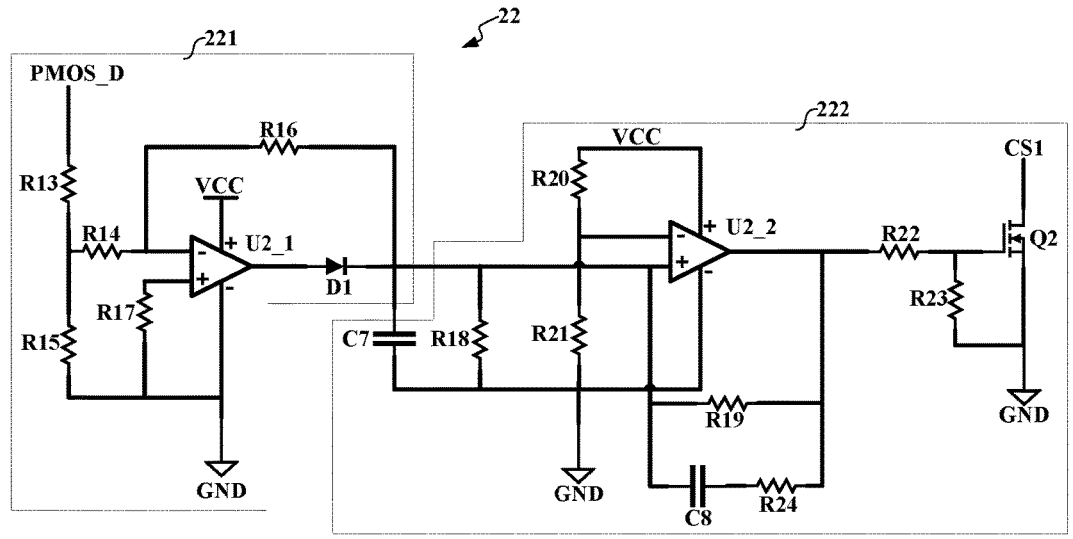
FIG. 5 shows a schematic diagram of a discharge voltage detection unit of the present disclosure.
Figure 6:
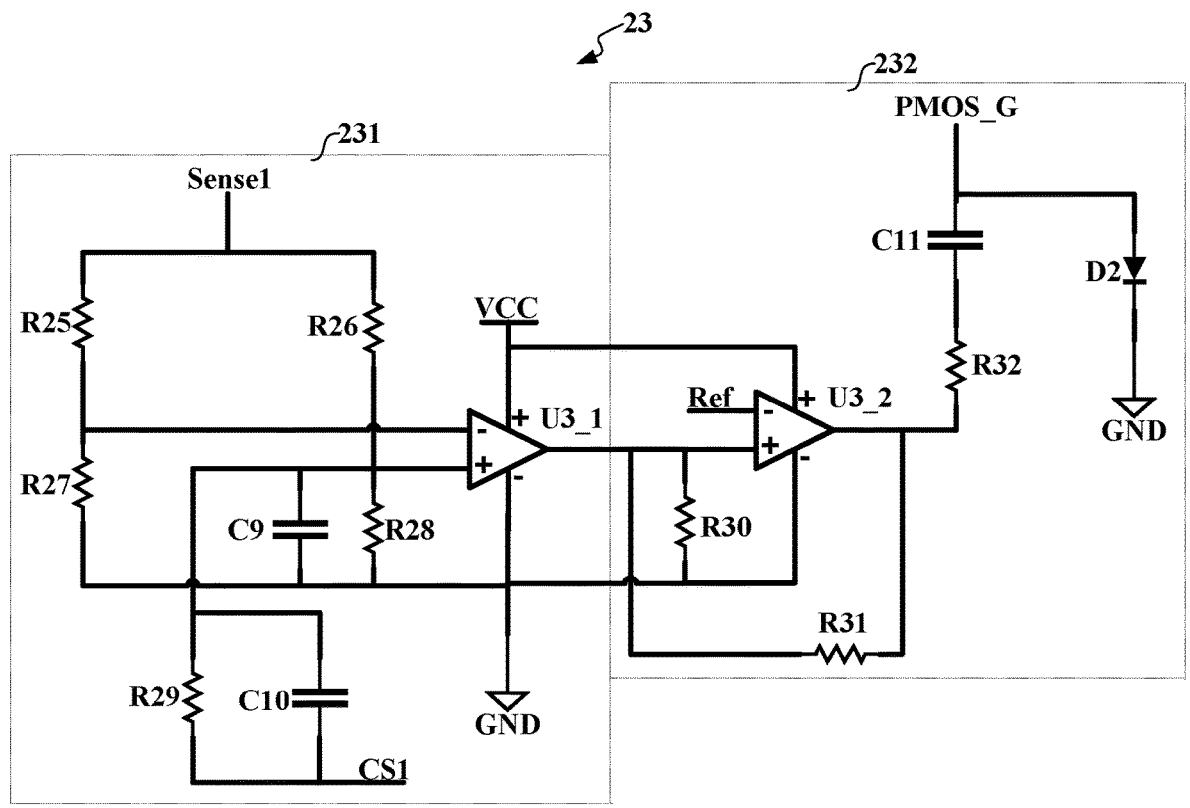
FIG. 6 shows a schematic diagram of a peak voltage detection unit of the present disclosure.

Specifically, as shown in FIG. 4-FIG. 6, the sampling control module 20 includes a differential sampling unit 21, a discharge voltage detection unit 22, and a peak voltage detection unit 23.

The differential sampling unit 21 is used to convert a sinusoidal voltage input by AC mains (aka, AC mains input voltage) into a steamed bread wave voltage, where the steamed bread wave voltage includes a first steamed bread wave voltage and a second steamed bread wave voltage.

More specifically, as shown in FIG. 4, the differential sampling unit 21 includes an input unit 211, a positive half-wave sampling unit 212, and a negative half-wave sampling unit 213.

The input unit 211 is connected to a live wire L and a neutral wire N to introduce the AC mains input voltage.

In one embodiment, the input unit 211 includes a first resistor R1 and a second resistor R2; a first end of the first resistor R1 is connected to a live wire L, and a second end of the first resistor R1 outputs a positive half-wave voltage of the sinusoidal voltage; a first end of the second resistor R2 is connected to the neutral wire N, and a second end of the second resistor R2 outputs a negative half-wave voltage of the sinusoidal voltage.

A positive input terminal of the positive half-wave sampling unit 212 is connected to the positive half-wave voltage of the sinusoidal voltage, and a negative input terminal of the positive half-wave sampling unit 212 is connected to the negative half-wave voltage of the sinusoidal voltage, so as to convert the positive half-wave voltage into the first steamed bread wave voltage by performing operational amplification on the positive half-wave voltage and the negative half-wave voltage.

In one embodiment, the positive half-wave sampling unit 212 includes a first operational amplifier U1_1, a third resistance R3, a fourth resistance R4, a fifth resistance R5, a sixth resistance R6, a seventh resistance R7, a first capacitor C1, a second capacitor C2, and a third capacitor C3; a positive input terminal of the first operational amplifier U1_1 is connected to the positive half-wave voltage of the sinusoidal voltage via the third resistor R3, and connected to a first end of the fourth resistor R4 and a first end of the first capacitor C1, a negative input terminal of the first operational amplifier U1_1 is connected to the negative half-wave voltage of the sinusoidal voltage via the fifth resistor R5, and connected to a first end of the sixth resistor R6 and a second end of the second capacitor C2, a power supply terminal of the first operational amplifier U1_1 is connected to a working voltage VCC, a grounding terminal of the first operational amplifier U1_1 is grounded, and an output terminal of the first operational amplifier U1_1 is connected to a first end of the seventh resistor R7; a second end of the fourth resistor R4 is connected to a second end of the first capacitor C1 and grounded; a second end of the sixth resistor R6 is connected to a second end of the second capacitor C2 and the output terminal of the first operational amplifier U1_1; a second end of the seventh resistor R7 is grounded via the third capacitor C3 and outputs the first steamed bread wave voltage.

A positive input terminal of the negative half-wave sampling unit 213 is connected to the negative half-wave voltage of the sinusoidal voltage, and a negative input terminal of the negative half-wave sampling unit 213 is connected to the positive half-wave voltage of the sinusoidal voltage, so as to convert the negative half-wave voltage into the second steamed bread wave voltage by performing operational amplification on the negative half-wave voltage and the positive half-wave voltage.

In one embodiment, the negative half-wave sampling unit 213 includes a second operational amplifier U1_2 an eighth resistor R8, a ninth resistor R9, a tenth resistor R10, an eleventh resistor R11, a twelfth resistor R12, a fourth capacitor C4, a fifth capacitor C5, and a sixth capacitor C6; a positive input terminal of the second operational amplifier U1_2 is connected to the negative half-wave voltage of the sinusoidal voltage via the eighth resistor R8, and connected to a first end of the ninth resistor R9 and a first end of the fourth capacitor C4, a negative input terminal of the second operational amplifier U1_2 is connected to the positive half-wave voltage of the sinusoidal voltage via the tenth resistor R10, and connected to a first end of the eleventh resistor R11 and a first end of the fifth capacitor C5, a power supply terminal of the second operational amplifier U1_2 is connected to the working voltage VCC, a grounding terminal of the second operational amplifier U1_2 is grounded, and an output terminal of the second operational amplifier U1_2 is connected to a first end of the twelfth resistor R12; a second end of the ninth resistor R9 is connected to a second end of the fourth capacitor C4 and grounded; a second end of the eleventh resistor R11 is connected to a second end of the fifth capacitor C5 and the output terminal of the second operational amplifier U1_2; a second end of the twelfth resistor R12 is grounded via the sixth capacitor C6 and outputs the second steamed bread wave voltage.

In one embodiment, the circuit structures of the positive half-wave sampling unit 212 and the negative half-wave sampling unit 213 are identical. For the positive half-wave sampling unit 212, the fifth resistor R5 and the sixth resistor R6 are used to adjust a magnification of the first operational amplifier U1_1; the resistance value of the third resistor R3 is equal to the resistance value of the fifth resistor R5; the resistance value of the fourth resistor R4 is equal to the resistance value of the sixth resistor R6; the third resistor R3 and the fourth resistor R4 are used for impedance matching; the first capacitor C1, the second capacitor C2, and the third capacitor C3 are used for harmonic filtering. For the negative half-wave sampling unit 213, the tenth resistor R10 and the eleventh resistor R11 are used to adjust a magnification of the second operational amplifier U1_2; the resistance value of the eighth resistor R8 is equal to the resistance value of the tenth resistor R10; the resistance value of the ninth resistor R9 is equal to the resistance value of the eleventh resistor R11; the eighth resistor R8 and the ninth resistor R9 are used for impedance matching; the fourth capacitor C4, the fifth capacitor C5 and the sixth capacitor C6 are used for harmonic filtering; the seventh resistor R7 and the twelfth resistor R12 are used for voltage division. In practical applications, the output terminal of the positive half-wave sampling unit 212 and the output terminal of the negative half-wave sampling unit 213 are connected to the same network node, so the third capacitor C3 and the sixth capacitor C6 are usually combined into one capacitor in which case, if a capacitor is set between a second end of the seventh resistor R7 and the ground, no capacitor will be set between a second end of the twelfth resistor R12 and the ground. In one embodiment, the positive half-wave voltage and negative half-wave voltage of the sinusoidal voltage are sampled by using a dual operational amplifier respectively, and a complete steamed bread wave voltage is formed by using resistor voltage division.

The discharge voltage detection unit 22 is connected to the drain of the PMOS power transistor Q1 to detect a voltage at the drain of the PMOS power transistor Q1 to obtain the power-down voltage and generate an auxiliary turn-on signal when the power-down voltage reaches the set voltage. In practical applications, the discharge voltage detection unit 22 detects the voltage at the drain of the PMOS power transistor Q1 in real time and prevents the voltage of the PMOS power transistor Q1 from being higher than a rated voltage; so, the PMOS power transistor Q1 can be a low-voltage power transistor, which reduces costs and improves reliability.

More specifically, as shown in FIG. 5, the discharge voltage detection unit 22 includes a detection and conversion unit 221 and a comparison and output unit 222.

The detection and conversion unit 221 is connected to a drain of the PMOS power transistor Q1 to detect a negative voltage at the drain of the PMOS power transistor Q1 and convert the negative voltage into a positive voltage to obtain the power-down voltage.

In one embodiment, the detection and conversion unit 221 includes a third operational amplifier U2_1, a thirteenth resistor R13, a fourteenth resistor R14, a fifteenth resistor R15, a sixteenth resistor R16, a seventeenth resistor R17, and a first diode D1; a first end of the thirteenth resistor R13 is connected to a drain of the PMOS power transistor Q1, and a second end of the thirteenth resistor R13 is connected to a first end of the fourteenth resistor R14 and a first end of the fifteenth resistor R15; a second end of the fourteenth resistor R14 is connected to a negative input terminal of the third operational amplifier U2_1 and connected to a negative terminal of the first diode D1 via the sixteenth resistor R16; a second end of the fifteenth resistor R15 is grounded; a positive input terminal of the third operational amplifier U2_1 is grounded via the seventeenth resistor R17, a power supply terminal of the third operational amplifier U2_1 is connected to the working voltage VCC, a grounding terminal of the third operational amplifier U2_1 is grounded, and an output terminal of the third operational amplifier U2_1 is connected to a positive terminal of the first diode D1; the negative terminal of the first diode D1 generates the power-down voltage.

In one embodiment, the thirteenth resistor R13 and the fifteenth resistor R15 sample the negative voltage at the drain of the PMOS power transistor Q1 based on resistor voltage division, the fourteenth resistor R14 and the sixteenth resistor R16 are used to adjust a magnification of the third operational amplifier U2_1, the seventeenth resistor R17 is used for impedance matching, the first diode D1 is used to avoid voltage backflow, the third operational amplifier U2_1 is used for operational amplification of a to-ground voltage and the negative voltage at the drain of the PMOS power transistor Q1, so as to convert the negative voltage at the drain of the PMOS power transistor Q1 to a positive voltage to obtain the power-down voltage. The negative voltage at the drain of the PMOS power transistor Q1 is expressed as $Vds=V_{rms}*I|\sin\theta|-Vbulk$, where $V_{rms}$ is the effective voltage of AC mains, Vbulk is the voltage across the bus capacitor, and θ is the current angle of AC mains.

The comparison and output unit 222 is connected to an output terminal of the detection and conversion unit 221 for comparing the power-down voltage and the set voltage, and generating the auxiliary turn-on signal after the power-down voltage reaches the set voltage.

In one embodiment, the comparison and output unit 222 includes a fourth operational amplifier U2_2, an eighteenth resistor R18, a nineteenth resistor R19, a twentieth resistor R20, a twenty-first resistor R21, a twenty-second resistor R22, a twenty-third resistor R23, a twenty-fourth resistor R24, a seventh capacitor C7, an eighth capacitor C8, and a switch transistor Q2; a positive input terminal of the fourth operational amplifier U2_2 is connected to the power-down voltage, a first end of the eighteenth resistor R18, a first end of the nineteenth resistor R19 and a first end of the seventh capacitor C7, a negative input terminal of the fourth operational amplifier U2_2 is connected to a first end of the twentieth resistor R20 and a first end of the twenty-first resistor R21, a power supply terminal of the fourth operational amplifier U2_2 is connected to the working voltage VCC, and a grounding terminal of the fourth operational amplifier U2_2 is grounded, and an output terminal of the fourth operational amplifier U2_2 is connected to a second end of the nineteenth resistor R19 and a second end of the twenty-second resistor R22; a second end of the eighteenth resistor R18 is connected to a second end of the seventh capacitor C7 and grounded; a second end of the twentieth resistor R20 is connected to the working voltage VCC; a second end of the twenty-first resistor R21 is grounded; a second end of the twenty-second resistor R22 is connected to a gate of the switch transistor Q2 and a first end of the twenty-third resistor R23; a source of the switch transistor Q2 is connected to a second end of the twenty-third resistor R23 and grounded, and a drain of the switch transistor Q2 generates the auxiliary turn-on signal; the eighth capacitor C8 and the twenty-fourth resistor R24 are connected in parallel with the nineteenth resistor R19 after being connected in series.

In one embodiment, the twentieth resistor R20 and the twenty-first resistor R21 are used for the division of the working voltage VCC and generate the set voltage; the eighteenth resistor R18 and the seventh capacitor C7 are used to form a discharge path when the PMOS power transistor Q1 is on to maintain the output of the third operational amplifier U2_1; the eighteenth resistor R18 and the nineteenth resistor R19 are used to adjust a hysteresis voltage to avoid output inversion of the fourth operational amplifier U2_2; the twenty-fourth resistor R24 and the eighth capacitor C8 are used for circuit adjustment to further avoid output inversion of the fourth operational amplifier U2_2; the power-down voltage and the set voltage are compared by the fourth operational amplifier U2_2; when the power-down voltage is greater than the set voltage, the switch transistor Q2 is turned on to connect in parallel the twenty-eighth resistor 28 and the twenty-ninth resistor R29 in the peak voltage detection unit 23, thereby generating the auxiliary turn-on signal; when the power-down voltage is less than the set voltage, the switch transistor Q2 is turned off. It should be noted that the value of the set voltage should be designed according to the values of the twentieth resistance R20 and the twenty-first resistance R21, which are usually greater than 0.3V.

In practical applications, the detection and conversion unit 221 may also include an output capacitor connected between a negative terminal of the first diode D1 and the ground for output filtering; however, when the comparison and output unit 222 may also include a seventh capacitor C7 to realize functions of the output capacitor.

The peak voltage detection unit 23 is connected to an output terminal of the differential sampling unit 21 and an output terminal of the discharge voltage detection unit 22 to detect the value of the steamed bread wave voltage, and generate the PMOS Turn-off signal after the detected value of the steamed bread wave voltage reaches a peak value, and generate the PMOS Turn-on signal according to the auxiliary turn-on signal.

More specifically, as shown in FIG. 6, the peak voltage detection unit 23 includes a differential amplification unit 231 and a drive generation unit 232.

The differential amplification unit 231 is connected to the output terminal of the differential sampling unit 21 and the output terminal of the discharge voltage detection unit 22 for differential amplification of the steamed bread wave voltage and generation of the output voltage, as well as pulling down the output voltage according to the auxiliary turn-on signal.

In one embodiment, the differential amplification unit 231 includes a fifth operational amplifier U3_1 a twenty-fifth resistance R25, a twenty-sixth resistance R26, a twenty-seventh resistance R27, a twenty-eighth resistance R28, a twenty-ninth resistance R29, a ninth capacitor C9, and a tenth capacitor C10; a first end of the twenty-fifth resistor R25 is connected to a first end of the twenty-sixth resistor R26 and the steamed bread wave voltage, and a second end of the twenty-fifth resistor R25 is connected to a first end of the twenty-seventh resistor R27 and a negative input terminal of the fifth operational amplifier U3_1; a second end of the twenty-sixth resistor R26 is connected to a first end of the twenty-eighth resistor R28, a first end of the twenty-ninth resistor R29, a first end of the ninth capacitor C9, a first end of the tenth capacitor C10 and a positive input terminal of the fifth operational amplifier U3_1; a second end of the twenty-seventh resistor R27, a second end of the twenty-eighth resistor R28 and a second end of the ninth capacitor C9 are grounded; a second end of the twenty-ninth resistor R29 is connected to a second end of the tenth capacitor C10 and the auxiliary turn-on signal; a power supply terminal of the fifth operational amplifier U3_1 is connected to a working voltage VCC, a grounding terminal of the fifth operational amplifier U3_1 is grounded, and an output terminal of the fifth operational amplifier U3_1 generates the output voltage.

In one embodiment, the resistance value of the twenty-fifth resistor R25 is equal to the resistance value of the twenty-sixth resistor R26; the resistance value of the twenty-seventh resistor R27 is slightly less than the resistance value of the twenty-eighth resistor R28; the ninth capacitor C9 is charged and discharged based on the rise and fall of the steamed bread wave voltage, so as to realize the differential sampling of the steamed bread wave voltage based on the voltage division by two groups of resistors, thus realizing differential amplification by using the fifth operational amplifier U3_1 and generating the output voltage; the twenty-ninth resistor R29 and the tenth capacitor C10 are connected in parallel with the twenty-eighth resistor R28 when the switch transistor Q2 is on, to pull down a voltage at a positive input terminal of the fifth operational amplifier U3_1 so that the output voltage is pull down according to the auxiliary turn-on signal. In practical applications, the length of delay before turning off the PMOS power transistor Q1 after the detected value of the steamed bread wave voltage reaches the peak value may be adjusted by having a different voltage division ratio between the twenty-sixth resistor R26 and the twenty-eighth resistor R28, as well as the capacitance value of the ninth capacitor C9.

The drive generation unit 232 is connected to an output terminal of the differential amplification unit 231 compares the output voltage and a reference voltage Vref, and generates the PMOS Turn-off signal when the output voltage is greater than the reference voltage Vref and generates the PMOS Turn-on signal when the output voltage is less than the reference voltage Vref. In practical applications, the reference voltage Vref shall be set according to the peak value of the AC mains input voltage.

In one embodiment, the drive generation unit 232 includes a sixth operational amplifier U3_2 a thirtieth resistor R30, a thirty-first resistor R31, a thirty-second resistor R32, an eleventh capacitor C11, and a second diode D2; a positive input terminal of the sixth operational amplifier U3_2 is connected to the output voltage, a first end of the thirtieth resistor R30 and a first end of the thirty-first resistor R31, a negative input terminal of the sixth operational amplifier U3_2 is connected to the reference voltage Vref, a power supply terminal of the sixth operational amplifier U3_2 is connected to the working voltage VCC, a grounding terminal of the sixth operational amplifier U3_2 is grounded, and an output terminal of the sixth operational amplifier U3_2 is connected to a first end of the thirty-second resistor R32; a second end of the thirtieth resistor R30 is grounded; a second end of the thirty-first resistor R31 is connected to the output terminal of the sixth operational amplifier U3_2; a second end of the thirty-second resistor R32 is connected to a first end of the eleventh capacitor C11; a second end of the eleventh capacitor C11 is connected to a positive terminal of the second diode D2 and generates the drive signal; a negative terminal of the second diode D2 is grounded.

In one embodiment, the thirtieth resistor R30 and the thirty-first resistor R31 are used to set a hysteresis voltage to avoid output inversion of the sixth operational amplifier U3_2; the sixth operational amplifier U3_2 compares the output voltage with the reference voltage Vref; when the output voltage is greater than the reference voltage Vref, the sixth operational amplifier U3_2 outputs a high voltage, and a voltage at a gate of the PMOS power transistor Q1 becomes a voltage drop Vf of the second diode D2, and at this time, the driving voltage of the PMOS power transistor Q1 is Vf, which turns off the PMOS power transistor; when the output voltage is less than the reference voltage Vref, a low voltage is output, and since voltage across the eleventh capacitor C11 cannot change suddenly, at this time, the voltage at the gate of the PMOS power transistor Q1 is negative, which turns on the PMOS power transistor Q1.

Accordingly, as shown in FIG. 3-FIG. 7, the present disclosure also provides a method to reduce bus capacitance based on the above adapter circuit, and the method includes steps 1), 2), and 3).

Step 1) simultaneously supplying power to a bus capacitor and a subsequent load by AC mains in an initial state, during which the bus capacitor stays in a charging state.

Specifically, from t0 to t1, a bus capacitor C0 and a subsequent load are powered by AC mains at the same time, wherein the bus capacitor C0 stays in a charging state and the capacitor voltage across the bus capacitor gradually rises to a peak; the differential sampling unit 21 converts a sinusoidal voltage input by AC mains (AC mains input voltage) into a steamed bread wave voltage and sends it to the peak voltage detection unit 23 for peak detection.

Step 2) detecting the value of the AC mains input voltage, and turning off a PMOS power transistor Q1 after the detected value of the AC mains input voltage reaches a peak value, where a discharge path of the bus capacitor C0 is disconnected and the capacitor voltage reaches a peak, and the subsequent load is powered by AC mains.

Specifically, from t1 to t2, the AC mains input voltage drops, charges on a plate of the ninth capacitor C9 that is connected to a positive input terminal of the fifth operational amplifier U3_1 is discharged via the twenty-eighth resistor R28, and a negative input terminal of the fifth operational amplifier U3_1 tracks the steamed bread wave voltage in real time. At this time, a voltage difference is generated between the positive and negative input terminals of the fifth operational amplifier U3_1 wherein the voltage at the positive input terminal of the fifth operational amplifier U3_1 is greater than the voltage at the negative input terminal of the fifth operational amplifier U3_1 and an output voltage of the fifth operational amplifier U3_1 is a product of an open-loop gain of the fifth operational amplifier U3_1 and the voltage difference between the positive and negative input terminals of the fifth operational amplifier U3_1 the sixth operational amplifier U3_2 compares the output voltage with the reference voltage Vref. Since the output voltage of the sixth operational amplifier U3_2 is greater than the reference voltage Vref, the sixth operational amplifier U3_2 outputs a high voltage, the voltage at the gate of the PMOS power transistor Q1 becomes a voltage drop Vf of the second diode D2, and at this time, a driving voltage of the PMOS power transistor Q1 is Vf, which turns off the PMOS power transistor, and disconnects the path connecting the bus capacitor C0 to ground, that is, the discharge path of the bus capacitor is disconnected. At this time, the bus capacitor C0 does not discharge, and the subsequent load is only powered by AC mains. It should be noted that when the capacitor voltage rises to a peak, the formula $Vbulk=\sqrt{2}V_{rms}$ is satisfied. Because the bus capacitor C0 has no discharge path during the period when PMOS power transistor Q1 is off, the voltage of the bus capacitor C0 remains unchanged.

Step 3) detecting a voltage at a drain of the PMOS power transistor Q1, and turning on the PMOS power transistor Q1 after a power-down voltage reaches a set voltage, where the discharge path of the bus capacitor C0 is established to supply power to the subsequent load based on the capacitor voltage.

Specifically, from t2 to t3, the AC mains input voltage continues to drop, and since the voltage of the bus capacitor remains unchanged, the voltage at the drain of the PMOS power transistor Q1 is negative; at this time, the detection and conversion unit 221 detects a negative voltage at the drain of the PMOS power transistor Q1, and converts the negative voltage into a positive voltage to obtain the power-down voltage; the fourth operational amplifier U2_2 compares the power-down voltage with a set voltage, and since the power-down voltage is greater than the set voltage, the fourth operational amplifier U2_2 outputs a high voltage, and at this time, the switch transistor Q2 is on, so that the twenty-eighth resistor R28 and the twenty-ninth resistor R29 in the differential amplification unit 231 are connected in parallel. At this moment, the voltage at the positive input terminal of the fifth operational amplifier U3_1 is pulled down, and the voltage at the negative input terminal of the fifth operational amplifier U3_1 is greater than the voltage at the positive input terminal, so the fifth operational amplifier U3_1 outputs a low voltage, that is, the output voltage is pulled down. Since a voltage at the negative input terminal of the sixth operational amplifier U3_2 is greater than a voltage at the positive input terminal thereof, the sixth operational amplifier U3_2 outputs a low voltage. Because the voltage across the eleventh capacitor C11 cannot change suddenly, the voltage at the gate of the PMOS power transistor Q1 is negative, which turns on the PMOS power transistor Q1. At this time, a path connecting the bus capacitor to ground is established, to raise the DC bus voltage and to supply power to the subsequent load based on the capacitor voltage.

Figure 2:
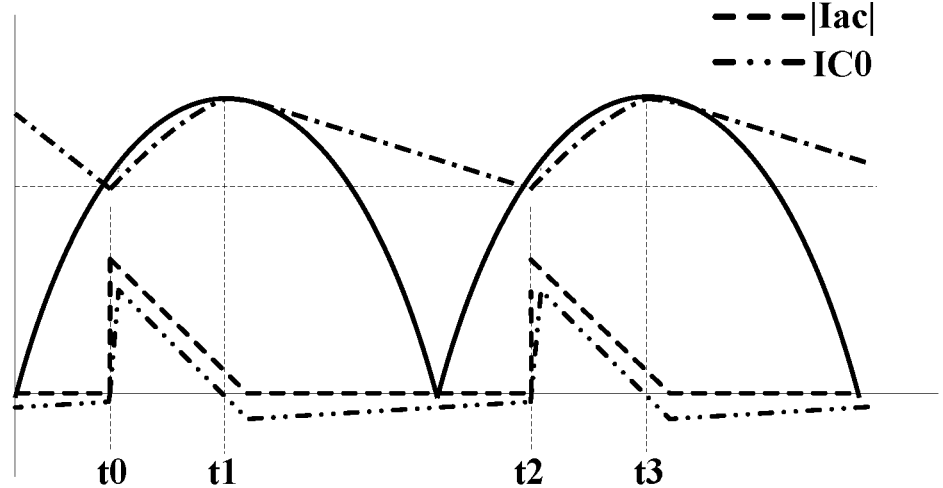
FIG. 2 shows waveforms of signals in the adapter circuit shown in FIG. 1.
Figure 7:
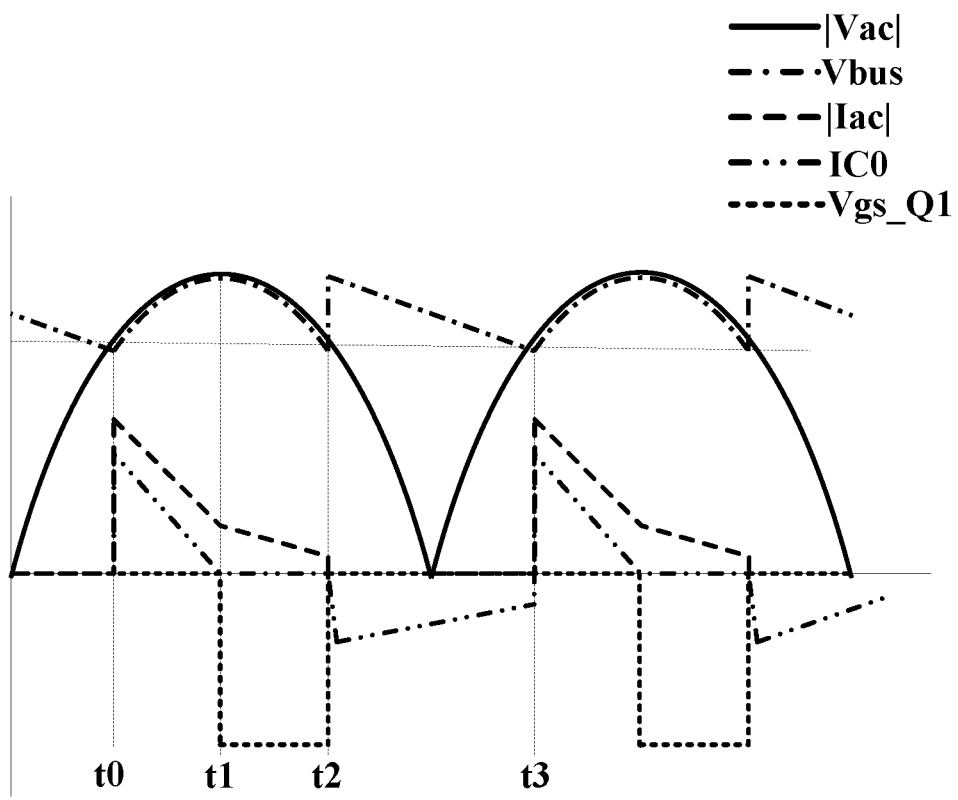
FIG. 7 shows waveforms of signals in the adapter circuit shown in FIG. 4.

Comparing FIG. 2 and FIG. 7, we can see that the adapter circuit provided by the present disclosure reduces the bus capacitor discharge time from t1-t2 in FIG. 2 to t2-t3 in FIG. 7. In other words, by controlling the on-off of the PMOS power transistor Q1, the power supply duration of AC mains is prolonged, and the discharge time of the bus capacitor is shortened, thus reducing the energy stored in the bus capacitor and reducing the volume of the bus capacitor.

Figure 8:
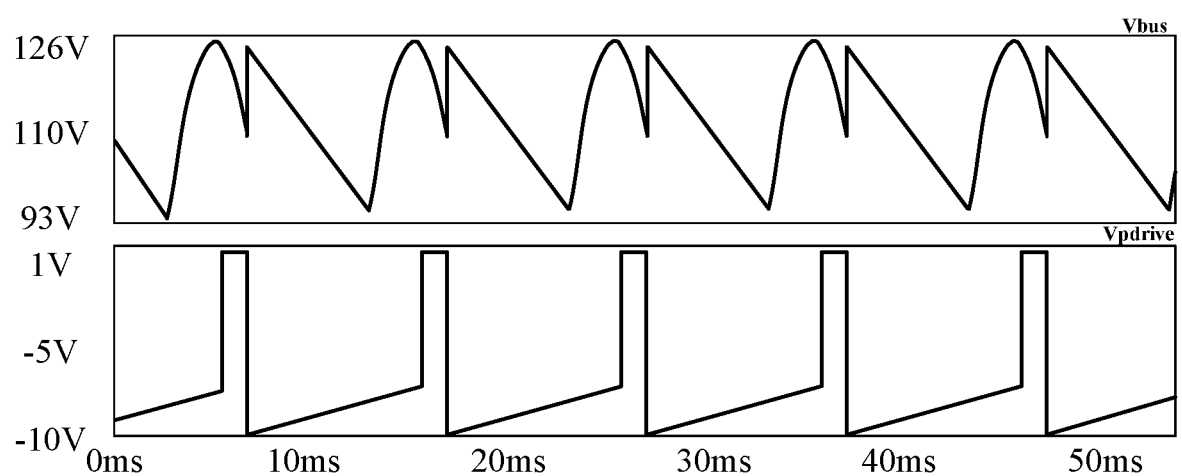
FIG. 8 shows waveforms of a simulated DC bus voltage and a simulated drive signal of the adapter circuit shown in FIG. 4.

The adapter circuit described herein was simulated in LTspice of Analog Devices, Inc., and the results are shown in FIG. 8. It can be seen that when the DC bus voltage reaches its peak, the driving voltage of PMOS power transistor Q1 rises over 0V; when the DC bus voltage drops below 110V, the driving voltage of PMOS power transistor Q1 becomes −10V, and at this time, the discharge path of the bus capacitor is established to raise the DC bus voltage close to its peak.

Figures 9, 10:
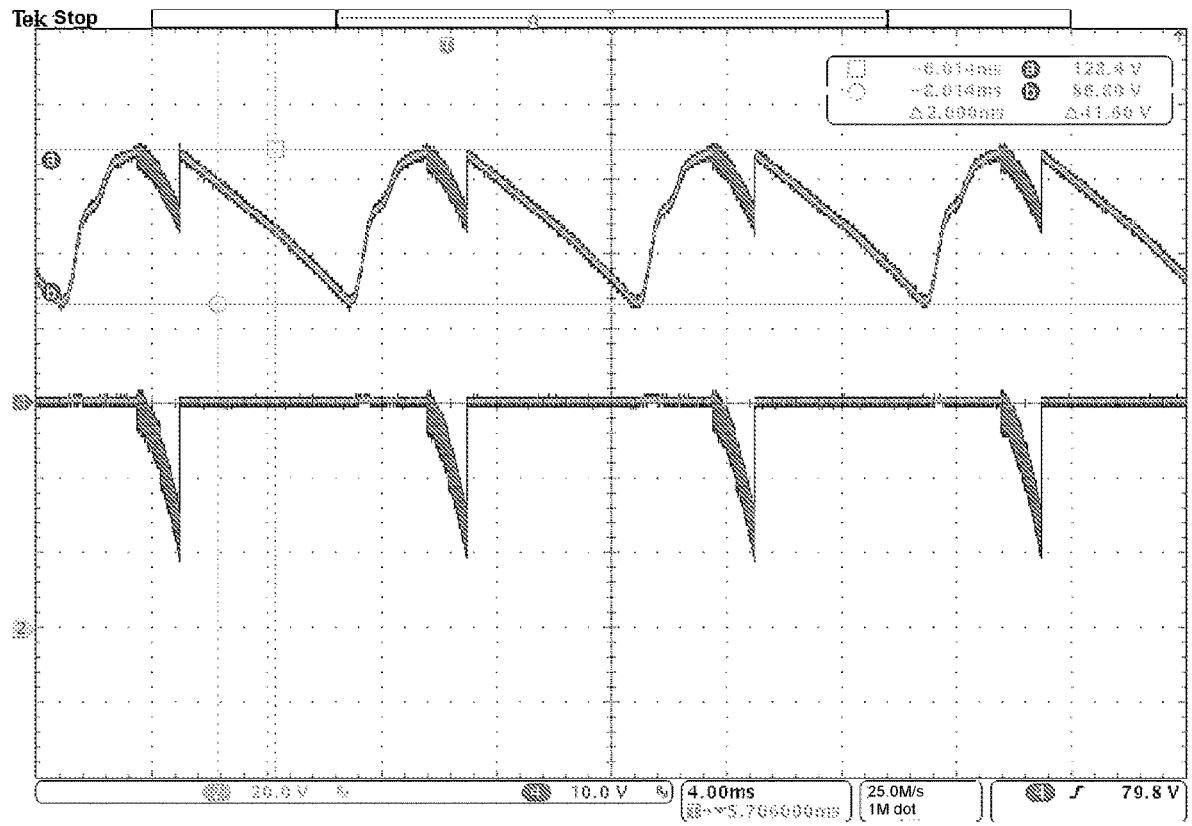
FIG. 9 shows waveforms of a measured DC bus voltage and a measured drive signal of the adapter circuit shown in FIG. 4.
FIG. 10 shows the comparison of power efficiency between the traditional scheme and the present scheme when different quantities of electrolytic capacitors are utilized.

A measured waveform of the adapter circuit provided by the present disclosure is shown in FIG. 9, where channel 4 responds to the voltage at the drain of the PMOS power transistor Q1, and the other channel to the DC bus voltage; according to the measured waveform, it can be seen that when the voltage at the drain of the PMOS power transistor Q1 is −20V, the DC bus voltage drops by 20V from its peak, and at this time, the PMOS power transistor Q1 is on, and the capacitor voltage raises the DC bus voltage close to the peak; reliability of this scheme is verified by both simulating, and real circuit testing.

In the actual measurement process, when three bus capacitors (i.e., three electrolytic capacitors in parallel) and four bus capacitors (i.e., four electrolytic capacitors in parallel) are respectively connected to 90-V AC mains with an output power of 65 W, the efficiency difference between the traditional scheme and the present scheme is shown in FIG. 10. It can be seen that the present scheme significantly improves the efficiency of the power source.

Accordingly, the present disclosure also provides a filter system which includes an adapter circuit as described above; the filter system may also include other existing circuit structures in addition to the above adapter circuit.

Accordingly, the present disclosure also provides an AC-DC power source which includes a filter system described above; the AC-DC power source may also include other existing circuit structures in addition to the filter system mentioned above.

In summary, the present disclosure provides an adapter circuit, a filter system, an AC-DC power source, and a method thereof, wherein through connecting a PMOS power transistor with a negative terminal of a bus capacitor in series and controlling the on-off of the PMOS power transistor by a sampling control module, the power supply duration of AC mains is prolonged and the energy stored in the bus capacitor is reduced, thus reducing the volume of the bus capacitor while retaining the same output power; a PMOS power transistor is used as the core device and connected in series with a bus capacitor and a source of the PMOS power transistor is grounded, so that a gate drive does not need to be grounded and the control thereof is relatively simple. For the power section of the circuit, only one PMOS transistor is needed and connected in series with a bus capacitor, making it easier to connect, control, and design a drive circuit. Therefore, the present disclosure effectively overcomes various shortcomings in the prior art and it is of great industrial value.

The above are only embodiments to exemplify the principle and function of the present disclosure and should not be considered limitations to the present disclosure. It should be noted that for a person of ordinary skill in the art, any changes, alterations, or modifications can be made without deviating from the spirit and scope of the present disclosure. These changes, alterations, or modifications should also be deemed to fall within the scope of the present disclosure.

What is claimed is:

1. An adapter circuit, comprising a bus capacitor, a PMOS power transistor, and a sampling control module;
    wherein a positive terminal of the bus capacitor is connected to a DC bus voltage, and a negative terminal of the bus capacitor is connected to a drain of the PMOS power transistor; a gate of the PMOS power transistor is connected to an output of the sampling control module, and receives a drive signal output by the sampling control module, and a source of the PMOS power transistor is grounded;
    wherein the sampling module is also connected to a drain of the PMOS power transistor and detects a voltage at the drain of the PMOS power transistor to obtain a power-down voltage;
    wherein the sampling control module is used to obtain the drive signal by detecting an AC mains input voltage and the power-down voltage in case of bus capacitor discharge, to turn off the PMOS power transistor after the AC mains input voltage reaches a first peak value, and to turn on the PMOS power transistor after the power-down voltage reaches a set voltage; the drive signal comprises a PMOS Turn-on signal and a PMOS Turn-off signal.

2. The adapter circuit according to claim 1, wherein the sampling control module comprises a differential sampling unit, a discharge voltage detection unit, and a peak voltage detection unit;
    wherein the differential sampling unit is used to convert a sinusoidal voltage input by AC mains power into a steamed bread wave voltage, and the steamed bread wave voltage comprises a first steamed bread wave voltage and a second steamed bread wave voltage;
    wherein the discharge voltage detection unit is connected to the drain of the PMOS power transistor to detect the voltage at the drain of the PMOS power transistor to obtain the power-down voltage, and generates an auxiliary turn-on signal when the power-down voltage reaches the set voltage;
    wherein the peak voltage detection unit connects an output terminal of the differential sampling unit and an output terminal of the discharge voltage detection unit, wherein the peak voltage detection unit detects a value of the steamed bread wave voltage and generates the PMOS Turn-off signal after the value of the steamed bread wave voltage is detected to reach a second peak value, and generates the PMOS Turn-on signal according to the auxiliary turn-on signal.

3. The adapter circuit according to claim 2, wherein the differential sampling unit comprises an input unit, a positive half-wave sampling unit, and a negative half-wave sampling unit;
- wherein the input unit is connected to a live wire and a neutral wire for introducing a sinusoidal voltage input by AC mains;
- wherein a positive input terminal of the positive half-wave sampling unit is connected to a positive half-wave voltage of the sinusoidal voltage, and a negative input terminal of the positive half-wave sampling unit is connected to a negative half-wave voltage of the sinusoidal voltage, wherein the positive half-wave sampling unit converts the positive half-wave voltage into the first steamed bread wave voltage by performing operational amplification on the positive half-wave voltage and the negative half-wave voltage;
- wherein a positive input terminal of the negative half-wave sampling unit is connected to the negative half-wave voltage of the sinusoidal voltage, and a negative input terminal thereof is connected to the positive half-wave voltage of the sinusoidal voltage, wherein the negative half-wave sampling unit converts the negative half-wave voltage into the second steamed bread wave voltage by performing operational amplification on the negative half-wave voltage and the positive half-wave voltage.

4. The adapter circuit according to claim 3, wherein the input unit comprises a first resistor and a second resistor;
- wherein a first end of the first resistor is connected to the live wire, and a second end of the first resistor outputs the positive half-wave voltage of the sinusoidal voltage; a first end of the second resistor is connected to the neutral wire, and a second end of the second resistor outputs the negative half-wave voltage of the sinusoidal voltage.

5. The adapter circuit according to claim 3, wherein the positive half-wave sampling unit comprises a first operational amplifier, a third resistor, a fourth resistor, a fifth resistor, a sixth resistor, a seventh resistor, a first capacitor, a second capacitor and a third capacitor;
- wherein a positive input terminal of the first operational amplifier is connected to the positive half-wave voltage of the sinusoidal voltage via the third resistor, and the positive input terminal of the first operational amplifier is connected to a first end of the fourth resistor and a first end of the first capacitor, a negative input terminal of the first operational amplifier is connected to the negative half-wave voltage of the sinusoidal voltage via the fifth resistor, and the negative input terminal of the first operational amplifier is connected to a first end of the sixth resistor and a second end of the second capacitor, a power supply terminal of the first operational amplifier is connected to a working voltage, a grounding terminal of the first operational amplifier is grounded, and an output terminal of the first operational amplifier is connected to a first end of the seventh resistor; a second end of the fourth resistor is connected to a second end of the first capacitor and grounded; a second end of the sixth resistor is connected to a second end of the second capacitor and the output terminal of the first operational amplifier; a second end of the seventh resistor is grounded via the third capacitor and outputs the first steamed bread wave voltage.

6. The adapter circuit according to claim 3, wherein the negative half-wave sampling unit comprises a second operational amplifier, an eighth resistor, a ninth resistor, a tenth resistor, an eleventh resistor, a twelfth resistor, a fourth capacitor, a fifth capacitor and a sixth capacitor;
- wherein a positive input terminal of the second operational amplifier is connected to the negative half-wave voltage of the sinusoidal voltage via the eighth resistor, and the positive input terminal of the second operational amplifier is connected to a first end of the ninth resistor and a first end of the fourth capacitor, a negative input terminal of the second operational amplifier is connected to the positive half-wave voltage of the sinusoidal voltage via the tenth resistor, and the negative input terminal of the second operational amplifier is connected to a first end of the eleventh resistor and a first end of the fifth capacitor, a power supply terminal of the second operational amplifier is connected to the working voltage, a grounding terminal of the second operational amplifier is grounded, and an output terminal of the second operational amplifier is connected to a first end of the twelfth resistor; a second end of the ninth resistor is connected to a second end of the fourth capacitor and grounded; a second end of the eleventh resistor is connected to a second end of the fifth capacitor and the output terminal of the second operational amplifier; a second end of the twelfth resistor is grounded via the sixth capacitor and outputs the second steamed bread wave voltage.

7. The adapter circuit according to claim 2, wherein the discharge voltage detection unit comprises a detection and conversion unit, and a comparison and output unit;
- wherein the detection and conversion unit is connected to the drain of the PMOS power transistor to detect a negative voltage at the drain of the PMOS power transistor, and convert the negative voltage into a positive voltage to obtain the power-down voltage;
- wherein the comparison and output unit is connected to an output terminal of the detection and conversion unit to compare the power-down voltage and the set voltage, and generate the auxiliary turn-on signal after the power-down voltage reaches the set voltage.

8. The adapter circuit according to claim 7, wherein the detection and conversion unit comprises a third operational amplifier, a thirteenth resistor, a fourteenth resistor, a fifteenth resistor, a sixteenth resistor, a seventeenth resistor and a first diode;
- wherein a first end of the thirteenth resistor is connected to the drain of the PMOS power transistor, and a second end of the thirteenth resistor is connected to a first end of the fourteenth resistor and a first end of the fifteenth resistor; a second end of the fourteenth resistor is connected to a negative input terminal of the third operational amplifier, and connected to a negative terminal of the first diode via the sixteenth resistor; a second end of the fifteenth resistor is grounded; a positive input terminal of the third operational amplifier is grounded via the seventeenth resistor, a power supply terminal of the third operational amplifier is connected to the working voltage, a grounding terminal of the third operational amplifier is grounded, and an output terminal of the third operational amplifier is connected to a positive terminal of the first diode; the negative terminal of the first diode generates the power-down voltage.

9. The adapter circuit according to claim 7, wherein the comparison and output unit comprises a fourth operational amplifier, an eighteenth resistor, a nineteenth resistor, a twentieth resistor, a twenty-first resistor, a twenty-second resistor, a twenty-third resistor, a twenty-fourth resistor, a seventh capacitor, an eighth capacitor, and a switch transistor;

wherein a positive input terminal of the fourth operational amplifier is connected to the power-down voltage, and connected to a first end of the eighteenth resistor, a first end of the nineteenth resistor and a first end of the seventh capacitor, a negative input terminal of the fourth operational amplifier is connected to a first end of the twentieth resistor and a first end of the twenty-first resistor, a power supply terminal of the fourth operational amplifier is connected to the working voltage, and a grounding terminal of the fourth operational amplifier is grounded, and an output terminal of the fourth operational amplifier is connected to a second end of the nineteenth resistor and a second end of the twenty-second resistor; a second end of the eighteenth resistor is connected to a second end of the seventh capacitor and grounded; a second end of the twentieth resistor is connected to the working voltage; a second end of the twenty-first resistor is grounded; a second end of the twenty-second resistor is connected to a gate of the switch transistor and a first end of the twenty-third resistor; a source of the switch transistor is connected to a second end of the twenty-third resistor and grounded, and a drain of the switch transistor generates the auxiliary turn-on signal; the eighth capacitor and the twenty-fourth resistor are connected in parallel with the nineteenth resistor after being connected in series.

10. The adapter circuit according to claim 2, wherein the peak voltage detection unit comprises a differential amplification unit and a drive generation unit;

wherein the differential amplification unit is connected to an output terminal of the differential sampling unit and an output terminal of the discharge voltage detection unit configured to perform differential amplification on the steamed bread wave voltage, generate an output voltage, and pull down the output voltage according to the auxiliary turn-on signal;

wherein the drive generation unit is connected to an output terminal of the differential amplification unit, configured to compare the output voltage and a reference voltage, generate the PMOS Turn-off signal when the output voltage is greater than the reference voltage, and generate the PMOS Turn-on signal when the output voltage is less than the reference voltage.

11. The adapter circuit according to claim 10, wherein the differential amplification unit comprises a fifth operational amplifier, a twenty-fifth resistor, a twenty-sixth resistor, a twenty-seventh resistor, a twenty-eighth resistor, a twenty-ninth resistor, a ninth capacitor and a tenth capacitor;

wherein a first end of the twenty-fifth resistor is connected to a first end of the twenty-sixth resistor and the steamed bread wave voltage, and a second end of the twenty-fifth resistor is connected to a first end of the twenty-seventh resistor and a negative input terminal of the fifth operational amplifier; a second end of the twenty-sixth resistor is connected to a first end of the twenty-eighth resistor, a first end of the twenty-ninth resistor, a first end of the ninth capacitor, a first end of the tenth capacitor and a positive input terminal of the fifth operational amplifier; a second end of the twenty-seventh resistor, a second end of the twenty-eighth resistor and a second end of the ninth capacitor are grounded; a second end of the twenty-ninth resistor is connected to a second end of the tenth capacitor and the auxiliary turn-on signal; a power supply terminal of the fifth operational amplifier is connected to the working voltage, a grounding terminal of the fifth operational amplifier is grounded, and an output terminal of the fifth operational amplifier generates the output voltage.

12. The adapter circuit according to claim 10, wherein the drive generation unit comprises a sixth operational amplifier, a thirtieth resistor, a thirty-first resistor, a thirty-second resistor, an eleventh capacitor and a second diode;

wherein a positive input terminal of the sixth operational amplifier is connected to the output voltage, and connected to a first end of the thirtieth resistor and a first end of the thirty-first resistor, a negative input terminal of the sixth operational amplifier is connected to the reference voltage, a power supply terminal of the sixth operational amplifier is connected to a working voltage, a grounding terminal of the sixth operational amplifier is grounded, and an output terminal of the sixth operational amplifier is connected to a first end of the thirty-second resistor; a second end of the thirtieth resistor is grounded; a second end of the thirty-first resistor is connected to an output terminal of the sixth operational amplifier; a second end of the thirty-second resistor is connected to a first end of the eleventh capacitor; a second end of the eleventh capacitor is connected to a positive terminal of the second diode and generates the drive signal; a negative terminal of the second diode is grounded.

13. The adapter circuit according to claim 1, further comprising a rectifier module which is configured to output the DC bus voltage after rectifying an AC mains input voltage.

14. A filter system, comprising an adapter circuit as described in claim 1.

15. An AC-DC power source, comprising a filter system as described in claim 14.

16. A method for reducing bus capacitance based on an adapter circuit as described in claim 1, comprising:

simultaneously supplying power to a bus capacitor and a subsequent load by AC mains in an initial state, where the bus capacitor stays in a charging state in the initial state;

detecting an AC mains input voltage and turning off the PMOS power transistor after a detected value of the AC mains input voltage peaks, where a discharge path of the bus capacitor is disconnected and a voltage across the bus capacitor peaks, and the subsequent load is powered by AC mains; and detecting a voltage at a drain of a PMOS power transistor, and turning on the PMOS power transistor after a power-down voltage reaches a set voltage, where the discharge path of the bus capacitor is established to supply power to the subsequent load based on the voltage across the bus capacitor.

17. The method for reducing bus capacitance according to claim 16, wherein energy stored in the bus capacitor is reduced by controlling the on-off of the PMOS power transistor to prolong a power supply duration of AC mains.

* * * * *